United States Patent
Zhao et al.

(10) Patent No.: US 9,490,884 B2
(45) Date of Patent: Nov. 8, 2016

(54) METHOD AND DEVICE FOR ACTIVATING UPLINK CLOSED LOOP TRANSMIT DIVERSITY

(75) Inventors: Jie Zhao, Shenzhen (CN); Meifang He, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 105 days.

(21) Appl. No.: 14/375,772

(22) PCT Filed: Jul. 23, 2012

(86) PCT No.: PCT/CN2012/079045
§ 371 (c)(1),
(2), (4) Date: Jul. 30, 2014

(87) PCT Pub. No.: WO2013/113212
PCT Pub. Date: Aug. 8, 2013

(65) Prior Publication Data
US 2014/0376481 A1  Dec. 25, 2014

(30) Foreign Application Priority Data

Jan. 30, 2012 (CN) .......................... 2012 1 0021077

(51) Int. Cl.
*H04W 4/00* (2009.01)
*H04B 7/06* (2006.01)
*H04W 76/04* (2009.01)
(Continued)

(52) U.S. Cl.
CPC .............. *H04B 7/06* (2013.01); *H04B 7/0619* (2013.01); *H04B 7/0689* (2013.01); *H04W 72/04* (2013.01); *H04W 76/046* (2013.01); *H04B 7/0404* (2013.01)

(58) Field of Classification Search
None
See application file for complete search history.

(56) References Cited

U.S. PATENT DOCUMENTS

2012/0287869 A1* 11/2012 Xi ........................... H04L 5/003
370/329
2013/0083776 A1*  4/2013 Hultell .................. H04W 24/00
370/331

FOREIGN PATENT DOCUMENTS

CN      101233698    7/2008

OTHER PUBLICATIONS

3GPP TSGRAN, UTRAN Iub interface Node B Application Part (NBAP) signaling (Release 11), 3GPP TS 25.433 V11.0.0, Dec. 2011, sections 8.2.17.2, 8.3.1.2, 8.3.2.2 and 9.2.2.159.

(Continued)

*Primary Examiner* — Chi H Pham
*Assistant Examiner* — Fahmida Chowdhury (57) ABSTRACT

Disclosed are a method and device for activating uplink closed loop transmit diversity (UL CLTD). The method comprises: a NodeB receives configuration information for the UL CLTD from a radio network controller, wherein the configuration information for the UL CLTD comprises an information element carrying the initialized UL CLTD active status, and the information element carrying the initialized UL CLTD active status is used for indicating an active status to be used when the NodeB activates the UL CLTD of a user equipment (UE); the NodeB activates the UL CLTD of the UE using the active status indicated by the information element carrying the initialized UL CLTD active status. The disclosure solves the problem in the prior art of the unclearness of which active status is to be used as the initialized active status, so as to ensure the implementation of the UL CLTD function.

15 Claims, 4 Drawing Sheets

(51) Int. Cl.
*H04W 72/04* (2009.01)
*H04B 7/04* (2006.01)

(56) References Cited

OTHER PUBLICATIONS

Huawei et al., Introduction of Uplink Closed Loop Transmit Diversity for HSPA, 3GPP TSG-RAN1 Meeting #67, R1-114381, Nov. 14-18, 2011, section 4.6C.2.2.3.
ZTE, Discussion on activation state initiation for UL CLTD, 3GPP TSG-RAN WG3 Meeting #75, R3-120155, Feb. 6-10, 2012, section 2.
ZTE, Initial activation state to the UL CLTD, control radio link in DRNS, 3GPP TSG-RAN3 Meeting #75, R3-120156, Feb. 6-10, 2012, section 8.3.1, 8.3.2, 8.3.4 and 9.2.2.131.
ZTE, Initial activation state to the UL CLTD, control cell in Node B, 3GPP TSG-RAN3 Meeting #75, R3-120157, Feb. 6-10, 2012, section 8.2.17, 8.3.1, 8.3.2 and 9.2.2.152.
International Search Report for PCT/CN2012/079045 dated Nov. 8, 2012.
Extended European Search Report for European Patent Application No. 12867109.6 dated Jun. 5, 2015.
Japanese Office Action for counterpart Japanese Patent Application No. 2014-553599 dated Feb. 29, 2016.
Alcatel-Lucent et al.: "Remaining Details of UL CLTD" (retrieved Nov. 21, 2011).
RAN WG1: "LS on RAN1 agreements on uplink 1-10 Closed Loop Transmit Diversity for HSPA" (retrieved Jan. 29, 2012).
Ericsson: "Further Discussion on the interaction of HS-SCCH orders and RRC reconfigurations for CLTD" (retrieved Nov. 9, 2011).
3GPP TS 25.433, "3rd Generation Partnership Project; Technical Specification Group Radio Access Network; UTRAN Iub interface Node B Application Part (NBAP) signalling (Release 11)".

* cited by examiner

Fig. 1

| a NodeB receives configuration information for the uplink closed loop transmit diversity (UL CLTD) from a radio network controller, wherein the configuration information for the UL CLTD comprises an information element carrying an initialized UL CLTD active status, and the information element carrying the initialized UL CLTD active status is used for indicating an active status to be used when the NodeB activates the UL CLTD of user equipment (UE) | S202 |

| The NodeB activates the UL CLTD of the UE using the active status indicated by the information element carrying the initialized UL CLTD active status | S204 |

METHOD AND DEVICE FOR ACTIVATING UPLINK CLOSED LOOP TRANSMIT DIVERSITY

TECHNICAL FIELD

The disclosure relates to the field of communication, in particular to a method and device for activating uplink closed loop transmit diversity.

BACKGROUND

The higher system capacity, wider cell covering and better service quality are achieved by multi-antenna technology by using a plurality of antennas at a transmitter and/or a receiver. The plurality of antennas at the transmitter and/or the receiver may both used for achieving the transmit diversity and receive diversity and also may used for achieving space multiplexing, wherein the transmit diversity technology is an anti-fading technology in the radio communication field in which at least two signals including same information are transmitted by the transmitter. These signals bearing the same information are sourced from at least two signal sources which are independent with each other. The transmit diversity technology, according to the structure and statistical properties of a sample value of a transmission signal and the difference of the occupied radio resources, may be divided into three basic types: space, frequency and time, and it also may be that the three basic types are combined with one another. The so-called space diversity refers to using the difference of the (space) positions of different launching sites, and the irrelevance on the statistic characteristics when a signal arrives at the receiver after going through a signal channel so as to achieve the anti-fading function. The so-called frequency diversity refers to using irrelevant features on statistics of signals on different frequency ranges after passing through a fading channel, that is, the difference on fading statistical properties of different frequency ranges, to achieve the anti-fading (frequency selectivity) function. When it is implemented, information to be sent is modulated on a carrier uncorrelated with a frequency for launching The so-called frequency diversity refers to using a random fading signal, when a time interval of a sampling point is large enough (greater than transmission channel coherence time), the fading among sampling points is unrelated to each other on statistics, that is, the difference of fading statistical properties on time is used to achieve the anti-time selective fading. The transmit diversity technology is divided into an open loop transmission diversity scheme and a closed loop transmission diversity scheme according to the fact that whether a receiver needs to feedback to a transmitter parameters required by the diversity. Under the open loop transmission diversity scheme, the receiver does not feedback any additional information relevant to transmitting, and the transmitter may use corresponding coding technique (such as, a simple space-time coding) by itself so as to complete the transmit diversity. Under the closed loop transmission diversity scheme, the receiver needs to use a feedback channel to feedback to a transmitter a parameter relevant to the transmission diversity (such as, a precoding vector required by the transmit diversity, indicated by precoding instructions), and after having received, the transmitter uses the feedback information to complete the transmit diversity.

Figure 1:
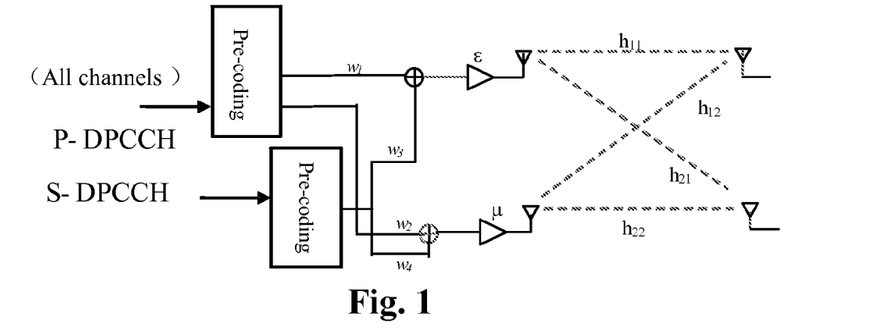
FIG. 1 is a schematic diagram of a structure of a channel for uplink closed loop transmit diversity according to the related art.

In 3GPP Release 10, an uplink open loop transmit diversity for users in a high speed uplink packet access (HSUPA) system has been set in a standard (TR25.863), the related content about the closed loop transmit diversity is being discussed at present, and a transmitted precoding indication (TPI) is introduced. At present, an agreement is reached on a channel structure for uplink closed loop transmit diversity, FIG. 1 is a schematic diagram of a structure of a channel for uplink closed loop transmit diversity according to the related art, as shown in FIG. 1, an uplink channel is added, that is, a secondary dedicated physical control channel (S-DPCCH). The channel uploads a second pilot value to a network side, the network uses the received second pilot value and a pilot value in a dedicated physical control channel (DPCCH) to learn the fading condition of the channel path for estimating a TPI value; a downlink channel is additionally added, which is similar to a fractional dedicated physical channel F-DPCH, that is, F-PCICH fractional precoding indication channel for transmitting a precoding value of the uplink transmit diversity to a terminal. TPI indication updating rate is three time slots. As for the 512 chip rate after having received TPI, a terminal uses the precode indicated in TPI to weigh at the first DPCCH time slot boundary. As for the received TPI, a terminal will measure the reliability thereof, if the terminal estimates a TPI region from the service link at previous 3 or 240 time slots, at least one TPI conforming code may meet a certain measurement threshold Qtpi, wherein Qtpi is determined by a dependence test, 3 or 240 time slots are determined by high level, and the terminal uses this received TPI command, that is a precoding value in the TPI region, to perform beam forming operation to complete the uplink closed loop transmit diversity.

The uplink closed loop transmit diversity is configured by the terminal, having five active statuses: an S-DPCCH channel link and a link formed by channels such as a DPCCH, dedicated physical data channel (DPDCH), an E-DCH dedicated physical control channel (E-DPCCH), and an E-DCHD dedicated physical data channel (E-DPDCH) are sent on two antennas after subjected to beam forming, and this status is called an uplink closed loop transmit diversity activation status 1.

An S-DPCCH channel link and a link formed by channels such as a DPCCH, a DPDCH, an E-DPCCH and an E-DPDCH are respectively sent on an antenna 1 and an antenna 2, and this status is called an uplink closed loop transmit diversity activation status 2.

An S-DPCCH channel link and a link formed by channels such as a DPCCH, a DPDCH, an E-DPCCH and an E-DPDCH are respectively sent on an antenna 2 and an antenna 1, and this status is called an uplink closed loop transmit diversity activation status 3.

A link formed by channels such as a DPCCH, a DPDCH, an E-DPCCH and an E-DPDCH is sent on an antenna, an S-DPCCH channel is closed, an antenna 2 is closed, and this status is called an uplink closed loop transmit diversity activation status 4.

A link formed by channels such as a DPCCH, a DPDCH, an E-DPCCH and an E-DPDCH is sent on an antenna 2, an S-DPCCH channel is closed, an antenna 1 is closed, and this status is called an uplink closed loop transmit diversity activation status 5.

However, for these five activation statuses, which active status is to be used by the NodeB as the initialized active status is not given in related arts.

SUMMARY

The disclosure is proposed for the problem that which active status is to be used by the NodeB as the initialized active status is not given in related arts; therefore, the disclosure provides a method and device for activating uplink closed loop transmit diversity to solve the above-mentioned problem.

According to one aspect of the disclosure, a method for activating uplink closed loop transmit diversity is provided. The method for activating uplink closed loop transmit diversity according to the disclosure comprises: a NodeB receiving configuration information for the UL CLTD from a radio network controller, wherein the configuration information for the UL CLTD comprises an information element carrying an initialized UL CLTD active status, and the information element carrying the initialized UL CLTD active status is used for indicating an active status to be used when the NodeB activates the UL CLTD of the UE; the NodeB activating the UL CLTD of the UE using the active status indicated by the information element carrying the initialized UL CLTD active status.

Preferably, the NodeB receiving the configuration information for the UL CLTD from the radio network controller comprises the NodeB receiving the configuration information for the UL CLTD from the radio network controller through an Iub port and/or an Iur port.

Preferably, the NodeB receives the configuration information for the UL CLTD from the radio network controller through a message including one of the following: a radio link establishment message, a radio link addition message, and a radio link reconfiguration message.

Preferably, the information element carrying the initialized UL CLTD active status is used, by enumerating, for indicating the active status to be used when the NodeB activates the UL CLTD of the UE, wherein the active status comprises at least one of the following: a first active status, a second active status, a third active status, a fourth active status and a fifth active status.

Preferably, the information element carrying the initialized UL CLTD active status is used, by enumerating, for indicating the active status to be used when the NodeB activates the UL CLTD of the UE, wherein an enumeration type comprises one of the following: activation and deactivation.

Preferably, if the configuration information for the UL CLTD does not comprise the information element carrying the initialized UL CLTD active status, the NodeB uses a preset active status to activate the UL CLTD of the UE.

Preferably, the preset active status is the first active status.

According to another aspect of the disclosure, a device for activating uplink closed loop transmit diversity is provided.

The device for activating uplink closed loop transmit diversity according to the disclosure may be provided on the NodeB and comprises: a receiving module, configured to receive configuration information for the UL CLTD from a radio network controller, wherein the configuration information for the UL CLTD comprising an information element carrying an initialized UL CLTD active status, and the information element carrying the initialized UL CLTD active status is used for indicating an active status to be used when the NodeB activates the UL CLTD of the UE; and an activation module, configured to use the active status indicated by the information element carrying the initialized UL CLTD active status to activate the UL CLTD of the UE.

Preferably, the receiving module comprises a first receiving module, configured to receive the configuration information for the UL CLTD from the radio network controller through an Iub port and/or an Iur port.

Preferably, the receiving module comprises a second receiving module, configured to receive the configuration information for the UL CLTD from the radio network controller comprises the NodeB receives the configuration information of the UL CLTD from the radio network controller through messages including one of the following: a radio link establishment message, a radio link addition message, and a radio link reconfiguration message.

With the disclosure, the NodeB uses the active status indicated by the information element carrying the initialized UL CLTD active status from the radio network controller as the initialized active status, so as to solve the above-mentioned problem and ensure the implementation of the UL CLTD function.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The preferred embodiments are described in conjunction with the drawings as follows. It shall be understood that the preferred embodiments described herein are only used to describe and explain the disclosure and shall not be construed as improper limitations on the same. The embodiments of the present application and the features of the embodiments may be combined with each other if there is no conflict.

The method in the following embodiments may be applied on a server, the server may be specifically configured to activate uplink closed loop transmit diversity, of course, it may be also applied to a group of servers, or it also may be used as a module in a server for common use with servers having other functions.

Figure 2:
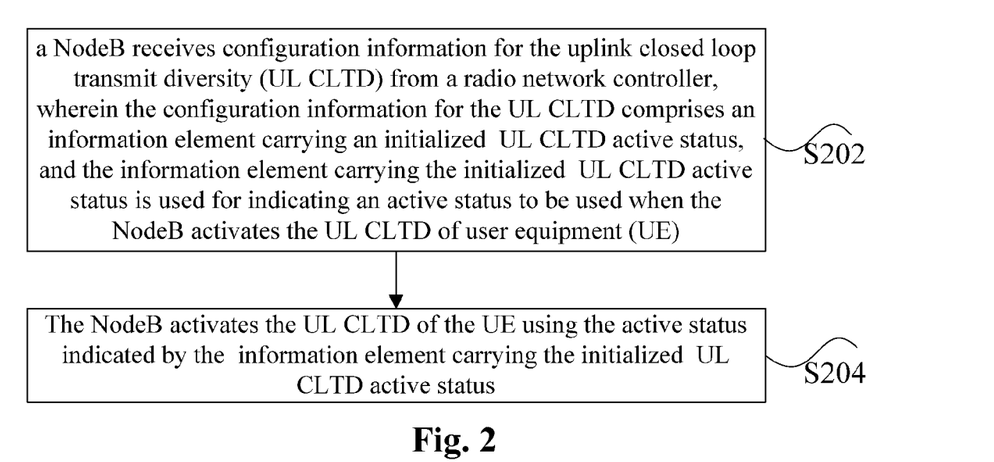
FIG. 2 is a flowchart of a method for activating uplink closed loop transmit diversity according to an embodiment of the disclosure.

The embodiment of the disclosure provides a method for activating uplink closed loop transmit diversity. FIG. 2 is a flowchart of a method for activating uplink closed loop transmit diversity according to an embodiment of the disclosure; as shown in FIG. 2, the following steps S202 to S204 are included.

Step S202, a NodeB receives configuration information for the uplink closed loop transmit diversity (UL CLTD) from a radio network controller, wherein the configuration information for the UL CLTD comprises an information element carrying an initialized UL CLTD active status, and the information element carrying the initialized UL CLTD active status is used for indicating an active status to be used when the NodeB activates the UL CLTD of a user equipment (UE).

Step S204, the NodeB activates the UL CLTD of the UE using the active status indicated by the information element carrying the initialized UL CLTD active status.

Which active status is to be used by the NodeB as the initialized active status is not given in related arts. In the present embodiment, the NodeB uses the active status indicated by the information element carrying the initialized UL CLTD active status from the radio network controller as the initialized active status, so as to solve the above-mentioned problem and ensure the implementation of the UL CLTD function.

Preferably, the NodeB receiving the configuration information for the UL CLTD from the radio network controller comprises the NodeB receiving the configuration information for the UL CLTD from the radio network controller through an Iub port and/or an Iur port.

Preferably, the NodeB receives the configuration information for the UL CLTD from the radio network controller through a message including one of the following: a radio link establishment message, a radio link addition message, and a radio link reconfiguration message.

Preferably, the information element carrying the initialized UL CLTD active status is used, by enumerating, for indicating the active status to be used when the NodeB activates the UL CLTD of the UE, wherein the active status comprises at least one of the following: a first active status, a second active status, a third active status, a fourth active status and a fifth active status.

Preferably, the information element carrying the initialized UL CLTD active status is used, by enumerating, for indicating the active status to be used when the NodeB activates the UL CLTD of the UE, wherein an enumeration type comprises one of the following: activation and deactivation.

In addition, if the configuration information for the UL CLTD does not comprise the information element carrying the initialized UL CLTD active status, the NodeB activates the UL CLTD of the UE using a preset active status, wherein the preset active status may be the first active status.

The implementation process of the embodiments of the disclosure is described in details with reference to the embodiments below.

Preferred Embodiment I

The preferred embodiment I describes that a radio network controller configures configuration information, carrying an information element carrying an initialized UL CLTD active status therein, of UL CLTD for a NodeB.

Figure 3:
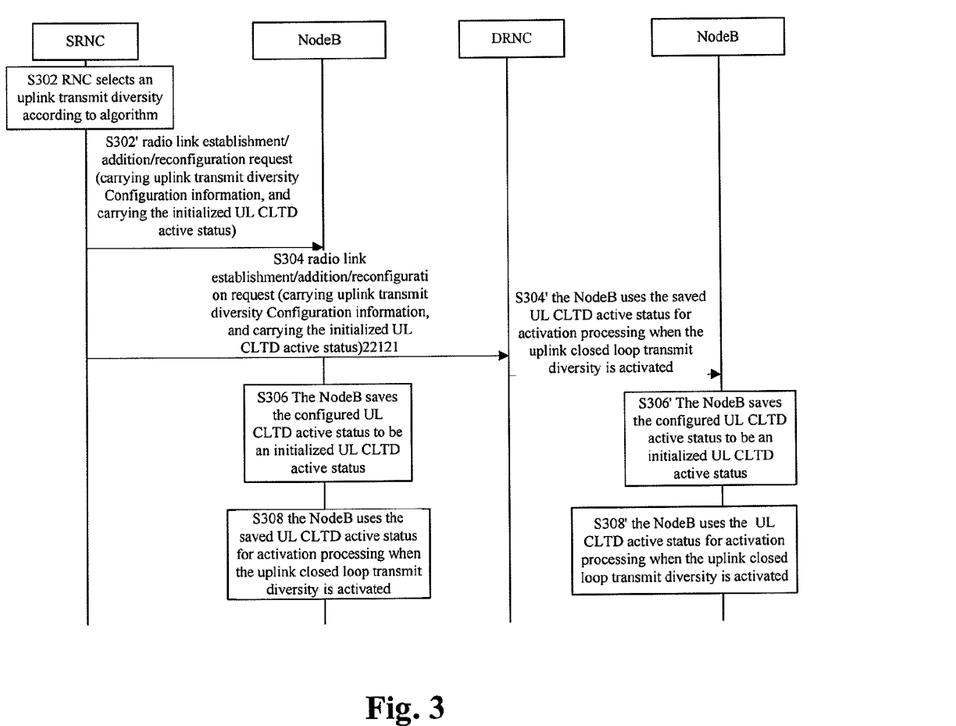
FIG. 3 is an interactive flowchart of a method for activating uplink closed loop transmit diversity according to a preferred embodiment I of the disclosure.

FIG. 3 is an interactive flowchart of a method for activating uplink closed loop transmit diversity according to a preferred embodiment I of the disclosure. As shown in FIG. 3, the following steps S302 to S308 are comprised:

step S302, a serving radio network controller (SRNC) configures an uplink closed loop transmit diversity scheme for a NodeB though a ground interface signalling according to algorithm, wherein the uplink transmit diversity scheme is a closed loop transmit diversity scheme (that is, CLTD), and relevant parameters thereof carry an UL CLTD active status.

The ground interface signalling may be a radio link establishment message, or a radio link addition message, or a radio link reconfiguration message.

The UL CLTD active status may be represented by using an enumeration type, and the enumeration type may be valued as a first status, a second status, a third status, a fourth status and a fifth status which respectively represent the above-mentioned five active statuses, or the UL CLTD active status may be represented using an enumeration type, and the enumeration type may be valued as activation and deactivation.

Step S304, the SRNC delivers the configuration information to a NodeB on D side through a drift radio network controller (DRNC).

Step S306, the NodeB saves the configured UL CLTD active status.

Step S308, the NodeB uses the saved UL CLTD active status for activation processing when the uplink closed loop transmit diversity is activated.

Preferred Embodiment II

The present preferred embodiment II describes that a network side configures configuration information, not carrying an information element carrying the initialized UL CLTD active status therein, of UL CLTD for a NodeB.

Figure 4:
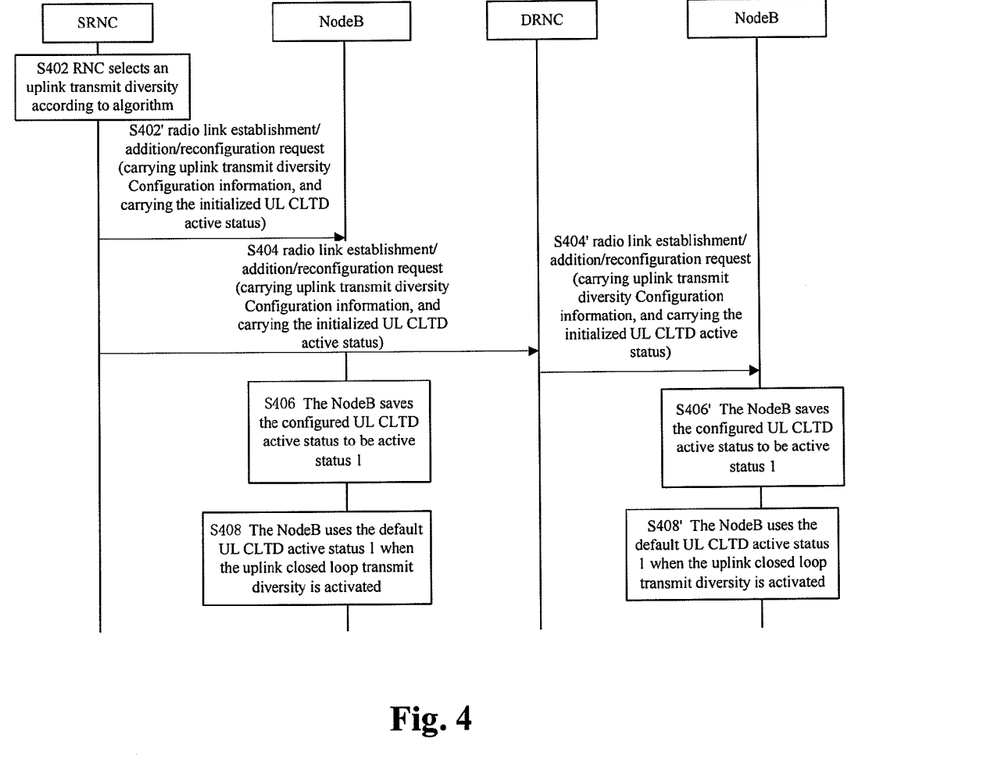
FIG. 4 is an interactive flowchart of a method for activating uplink closed loop transmit diversity according to a preferred embodiment II of the disclosure.

FIG. 4 is an interactive flowchart of a method for activating uplink closed loop transmit diversity according to an preferred embodiment II of the disclosure. As shown in FIG. 4, the following steps S402 to S408 are comprised:

step S402, a radio network controller (RNC) configures an uplink closed loop transmit diversity scheme for a NodeB though a ground interface signalling according to algorithm, wherein the uplink transmit diversity scheme is a closed loop diversity scheme (that is, CLTD); however, relevant parameters thereof do not carry a UL CLTD active status.

The ground interface signalling may be a radio link establishment message, a radio link addition message, or a radio link reconfiguration message.

Step S404, the SRNC delivers the configuration information to a NodeB on D side though a DRNC.

Step S406, the NodeB saves the UL CLTD active status to be a fixed initialized active status, for example, the initialized active status is 1.

and step S408, the NodeB uses the saved UL CLTD active status 1 for activation when the uplink closed loop transmit diversity is activated.

It should be noted that the steps shown in the flowchart of the drawings may be executed, for example, in a computer system with a set of instructions executable by a computer, in addition, a logic order is shown in the flowchart, but the shown or described steps may be executed in a different order under some conditions.

Figure 5:
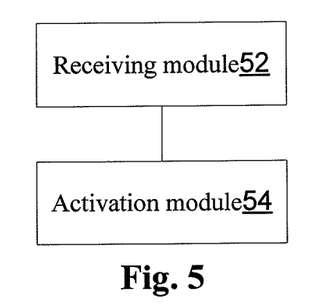
FIG. 5 is a structural block diagram of a device for activating uplink closed loop transmit diversity according to an embodiment of the disclosure.

The embodiment of the disclosure provides an device for activating uplink closed loop transmit diversity, the device for activating uplink closed loop transmit diversity may be used for a NodeB and used for realizing the above-mentioned method for activating uplink closed loop transmit diversity. FIG. 5 is a structural block diagram of a device for activating uplink closed loop transmit diversity according to an embodiment of the disclosure, as shown in FIG. 5, a receiving module 52 and an activation module 54 are included, which are described below in detail.

The receiving module 52 is configured to receive configuration information for UL CLTD from a radio network controller, wherein the configuration information for the UL CLTD comprises an information element carrying an initialized UL CLTD active status, and the information element carrying the initialized UL CLTD active status is used for indicating an active status to be used when the NodeB activates the UL CLTD of the user equipment UE; and the activation module 54 is connected to the receiving module 52 and is configured to activate the UL CLTD of the UE using the active status indicated by the information element carrying the initialized UL CLTD active status included by the configuration information for the UL CLTD received by the receiving module 52.

Figure 6:
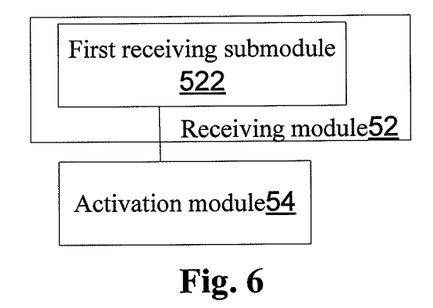
FIG. 6 is a structural block diagram of a device for activating uplink closed loop transmit diversity according to a preferred embodiment I of the disclosure.

FIG. 6 is a structural block diagram of a device for activating an uplink closed loop transmit diversity according to a preferred embodiment I of the disclosure, as shown in FIG. 6, the receiving module 52 comprises a first receiving submodule 522 which is configured to receive the configuration information for the UL CLTD from the radio network controller through an Iub port and/or an Iur port.

Figure 7:
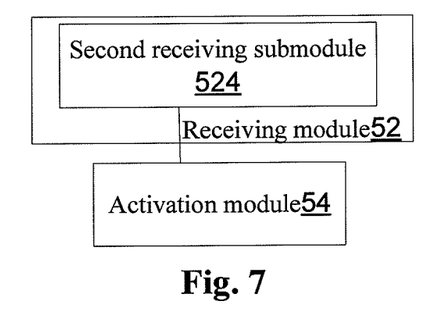
FIG. 7 is a structural block diagram of a device for activating uplink closed loop transmit diversity according to a preferred embodiment II of the disclosure.

FIG. 7 is a structural block diagram of a device for activating an uplink closed loop transmit diversity according to a preferred embodiment II of the disclosure, as shown in FIG. 7, the receiving module 52 comprises a second receiving submodule 524 which is configured to receive configuration information for the UL CLTD from the radio network controller through a message including one of the following: a radio link establishment message, a radio link addition message, and a radio link reconfiguration message.

It should be noted that the device for activating uplink closed loop transmit diversity described in the device embodiment corresponds to the above-mentioned method embodiment, with the specific implementation described in the method embodiment in detail, thereby needing no further description.

In conclusion, according to the above-mentioned embodiments of the disclosure, a method and device for activating uplink closed loop transmit diversity is provided. With the embodiments of disclosure, the NodeB uses the active status indicated by the information element carrying the initialized UL CLTD active status from the radio network controller as the initialized active status, so as to solve the above-mentioned problem and ensure the implementation of the UL CLTD function.

Obviously, those skilled in the art shall understand that the above-mentioned modules and steps of the disclosure may be realized by using general purpose calculating device, may be integrated in one calculating device or distributed on a network which consists of a plurality of calculating devices. Alternatively, the modules and the steps of the disclosure may be realized by using the executable program code of the calculating device. Consequently, they may be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for activating uplink closed loop transmit diversity, comprising:
a NodeB receiving configuration information for the uplink closed loop transmit diversity (UL CLTD) from a radio network controller, wherein the configuration information for the UL CLTD comprises an information element carrying an initialized UL CLTD active status, and the information element carrying the initialized UL CLTD active status is used for indicating an active status to be used when the NodeB activates the UL CLTD of a user equipment (UE);
and the NodeB activating the UL CLTD of the UE using the active status indicated by the information element carrying the initialized UL CLTD active status.

2. The method according to claim 1, wherein the NodeB receiving the configuration information for the UL CLTD from the radio network controller comprises the NodeB receiving the configuration information for the UL CLTD from the radio network controller through an Iub port and/or an Iur port.

3. The method according to claim 1, wherein the NodeB receives the configuration information for the UL CLTD from the radio network controller through one of the following message: a radio link establishment message, a radio link addition message, and a radio link reconfiguration message.

4. The method according to claim 1, wherein the information element carrying the initialized UL CLTD active status is used, by enumerating, for indicating the active status to be used when the NodeB activates the UL CLTD of the UE, wherein the active status comprises at least one of the following: a first active status, a second active status, a third active status, a fourth active status and a fifth active status.

5. The method according to claim 1, wherein the information element carrying the initialized UL CLTD active status is used, by enumerating, for indicating the active status to be used when the NodeB activates the UL CLTD of the UE, wherein an enumeration type comprises one of the following: activation and deactivation.

6. The method according to claim 1, wherein if the configuration information for the UL CLTD does not comprise the information element carrying the initialized UL CLTD active status, the NodeB activates the UL CLTD of the UE using a preset active status.

7. The method according to claim 6, wherein the preset active status is the first active status.

8. A device for activating uplink closed loop transmit diversity, applied to a NodeB, comprising:
a receiving module, configured to receive configuration information for the uplink closed loop transmit diversity (UL CLTD) from a radio network controller, wherein the configuration information for the UL CLTD comprises an information element carrying the initialized UL CLTD active status, and the information element carrying the initialized UL CLTD active status is used for indicating an active status to be used when the NodeB activates the UL CLTD of a user equipment (UE);
and an activation module, configured to activate the UL CLTD of the UE using the active status indicated by the information element carrying the initialized UL CLTD active status.

9. The device according to claim 8, wherein the receiving module comprises a first receiving module, configured to receive the configuration information for the UL CLTD from the radio network controller through an Iub port and/or an Iur port.

10. The device according to claim 8, wherein the receiving module comprises a second receiving module, configured to receive the configuration information for the UL CLTD from the radio network controller through a message including one of the following: a radio link establishment message, a radio link addition message, and a radio link reconfiguration message.

11. The method according to claim 2, wherein if the configuration information for the UL CLTD does not comprise the UL CLTD active status information element, the NodeB activates the UL CLTD of the UE using a preset active status.

12. The method according to claim 3, wherein if the configuration information for the UL CLTD does not comprise the UL CLTD active status information element, the NodeB activates the UL CLTD of the UE using a preset active status.

13. The method according to claim 4, wherein if the configuration information for the UL CLTD does not comprise the UL CLTD active status information element, the NodeB activates the UL CLTD of the UE using a preset active status.

14. The method according to claim 5, wherein if the configuration information for the UL CLTD does not comprise the UL CLTD active status information element, the NodeB activates the UL CLTD of the UE using a preset active status.

15. A method for activating uplink closed loop transmit diversity, comprising:
- a NodeB receiving configuration information for the uplink closed loop transmit diversity (UL CLTD) from a radio network controller, wherein the configuration information for the UL CLTD comprises an information element carrying an initialized UL CLTD active status, and the information element carrying the initialized UL CLTD active status is used for indicating an active status to be used when the NodeB activates the UL CLTD of a user equipment (UE);
- the NodeB activating the UL CLTD of the UE using the active status indicated by the information element carrying the initialized UL CLTD active status;
- wherein if the configuration information for the UL CLTD does not comprise the information element carrying the initialized UL CLTD active status, the NodeB activates the UL CLTD of the UE using a preset active status; and
- wherein the preset active status is the first active status.

* * * * *